(12) United States Patent
Xiong

(10) Patent No.: US 8,762,587 B2
(45) Date of Patent: Jun. 24, 2014

(54) DATA ACQUISITION CARD, EXPANSION CONTROL SYSTEM FOR DATA ACQUISITION CARD AND METHOD THEREOF

(75) Inventor: Yong Xiong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 242 days.

(21) Appl. No.: 13/389,347

(22) PCT Filed: Mar. 24, 2010

(86) PCT No.: PCT/CN2010/071258
§ 371 (c)(1),
(2), (4) Date: Feb. 7, 2012

(87) PCT Pub. No.: WO2011/022964
PCT Pub. Date: Mar. 3, 2011

(65) Prior Publication Data
US 2012/0137037 A1 May 31, 2012

(30) Foreign Application Priority Data
Aug. 25, 2009 (CN) .......................... 2009 1 0189904

(51) Int. Cl.
G06F 13/00 (2006.01)
(52) U.S. Cl.
USPC .............................................. 710/9; 710/301
(58) Field of Classification Search
USPC ................................................ 710/8–10, 301
See application file for complete search history.

(56) References Cited

U.S. PATENT DOCUMENTS

2008/0022165 A1* 1/2008 McKim et al. ................ 714/712

FOREIGN PATENT DOCUMENTS

| CN | 101000506 A | 7/2007 |
| CN | 101645054 A | 2/2010 |
| GB | 1268445 A | 3/1972 |

OTHER PUBLICATIONS

International Search Report for PCT/CN2010/071258 dated Jun. 11, 2010.

* cited by examiner

Primary Examiner — Glenn A Auve
(74) Attorney, Agent, or Firm — Ling Wu; Stephen Yang; Ling and Yang Intellectual Property LLC

(57) ABSTRACT

A data acquisition card, an expansion control system for a data acquisition card and a method thereof are disclosed. The method includes: a card address is preset for each data acquisition card, a channel address is preset for each data channel in the data acquisition card; the data acquisition card generates a corresponding card address signal after receiving a card beat signal from a user circuit, and judges whether the data acquisition card is selected; if the data acquisition card is selected, it generates a corresponding channel address signal after receiving a channel beat signal from the user circuit, and selects the data channel corresponding to the channel address signal. The data acquisition card, the expansion control system for the data acquisition card and the method thereof have powerful expansibility and high stability.

20 Claims, 10 Drawing Sheets

DATA ACQUISITION CARD, EXPANSION CONTROL SYSTEM FOR DATA ACQUISITION CARD AND METHOD THEREOF

TECHNICAL FIELD

The present invention relates to the field of data transmission and processing, and particularly, to a data acquisition card, an extension control system of data acquisition cards and a method thereof.

BACKGROUND OF THE RELATED ART

At present, more and more electronic products, such as industrial control, medical treatment, communication and consumption etc., are intelligent with each passing day, and an embedded system with a microprocessor as its core gains increasingly extensive application. In many applications scenarios, the microprocessor needs to pick up some information or instructions of the surrounding environment, and by means of intelligent analyzing and processing, at last, outputs necessary control information. For example, the user uses various types of sensors for detecting or sensing outside signals, physical conditions (such as, light, heat, humidity) or chemical compositions (such as smog), etc., the sensor converts these information into electric signals with a definite format and transmits to the microprocessor to be analyzed and processed, and finally the microprocessor will perform the corresponding adjustment or control according to these information data.

Data acquisition cards are devices which acquire digital or analog signals from sensors or other equipments to be detected and send the signals to the microprocessor to be analyzed and processed. These data acquisition cards connect with a user circuit by a bus generally by using a general bus interface, wherein, the bus interface comprises types of ISA, PCI, PC/104, PXI, CPCI, USB, Fire Wire (1394) and Compact Flash, etc., and the bus usually divides into a parallel bus and a serial bus. For the parallel bus such as ISA, PCI, etc., the connected signal wires are so many that the signal transmission distance is short and the extensibility is insufficient; for the serial bus such as USB, 1394, etc., farther access distance is allowed and usage of the bus is convenient, but it has a higher requirement for the processor ability and the software system in the user circuit.

At present, some data acquisition cards having serial interfaces such as RS232, RS485, etc. appear on the market, and these data acquisition cards, after automatically acquiring input data signals, can send them to the user circuit by a communication protocol with a definite format, and receive the control of the output data signals of the user circuit. However, these data acquisition cards have the following drawbacks: firstly, some applications scenarios do not have the serial interfaces such as RS232/RS485, etc, and the software and physical condition are hard to support; secondly, the software communication and protocol bring about a certain impact to the usage of data acquisition card, not only there are problems of software upgrading and protocol compatibility and so on, but also the data acquisition card needs to complete data processing procedure such as decoding, verifying, etc., thus its extensibility and stability are both restricted by the data processing ability; for example, if the communication protocol is made to be very easy, then it needs a matched data verifying ability, and is inappropriate for using under the bad environment, and the extensibility is insufficient; and if the communication protocol is made to be very difficult, the user is hard to perform the accurate verification on it, then it is inconvenient to use.

SUMMARY OF THE INVENTION

The technical problems to be solved by the present invention is to provide a data acquisition card, an extension control system of data acquisition cards and method thereof with strong extensibility and high stability.

The technical scheme used for solving the technical problem in the present invention is that:

an extension control method of data acquisition cards adapted for the data acquisition cards configured in parallel, comprises: presetting a card address for each data acquisition card, and presetting a channel address for each data channel in the data acquisition card; wherein the method further comprises:

the data acquisition card receiving a card beat signal from a user circuit, generating a corresponding card address signal, and the data acquisition card comparing the card address signal with the preset card address, and judging whether the data acquisition card is gated;

when a judging result is that the data acquisition card is gated, the data acquisition card receiving a channel beat signal from the user circuit and generating a corresponding channel address signal, and after the data acquisition card compares the channel address signal with the preset channel address, gating the data channel corresponding to the channel address signal.

After gating the data channel corresponding to the channel address signal, the method further comprises the following steps of: the data acquisition card sending output data signals from the user circuit to the gated data channel, or acquiring from the gated data channel input data signals and sending to the user circuit.

The input data signals comprise input digital signals and/or input analog signals; and the output data signals comprise output digital signals and/or output analog signals.

A transmission method of the input data signals and the output data signals is: different types of the input data signals and the output data signals transmitting in a bus by different cables;

a transmission method of the card beat signal and the channel beat signal is: the card beat signal and the channel beat signal transmitting in a bus by one individual cable.

Before the data acquisition card receives the card beat signal from the user circuit, the method further comprises a step of performing zero clearing on the card address signal or the channel address signal.

After the data acquisition card generates the corresponding card address signal, the method further comprises a step of latching the card address signal.

The procedure of the data acquisition card sending the output data signals from the user circuit to the gated data channel comprises:

the gated data acquisition card receiving an invalid channel latch signal;

the gated data acquisition card receiving the output data signals from the user circuit;

the gated data acquisition card receiving a valid channel latch signal;

the gated data acquisition card receiving an invalid channel latch signal.

The method further comprises: the ungated data acquisition card suspending sending the input data signals to the user circuit, and suspending receiving the output data signals from the user circuit.

A data acquisition card comprises a card gate module, a channel address generation module and a signal processing module; wherein, the card gate module, is configured to preset a card address, receive a card beat signal from a user circuit and generate a corresponding card address signal, and is further configured to compare the card address signal with the preset card address, and then judge whether the data acquisition card is gated;

the channel address generation module, is configured to receive the channel beat signal from the user circuit and generate a corresponding channel address signal, and send the channel address signal to the signal processing module;

the signal processing module, is configured to preset a channel address for a data channel, compare the channel address signal with the preset channel address when the data acquisition card is gated, gate the corresponding data channel according to a comparison result, and send output data signals from the user circuit to the gated data channel, or acquire from the gated data channel input data signals and send the input data signals to the user circuit.

Both the card gate module and the channel address generation module are equipped with a counter;

the counter in the card gate module, is configured to generate the corresponding card address signal according to the number of card beat signal(s);

the counter in the channel address generation module, is configured to generate the corresponding channel address signal according to the number of channel beat signal(s).

An extension control system of data acquisition cards comprises a user circuit and the data acquisition cards configured in parallel, wherein: the user circuit comprises a beat signal control module, and the data acquisition card comprises a card gate module, a channel address generation module and a signal processing module; wherein, the beat signal control module, is configured to send a card beat signal and a channel beat signal to the data acquisition card;

the card gate module, is configured to preset a card address for the data acquisition card, receive the card beat signal from the beat signal control module and generate a corresponding card address signal, and is further configured to compare the card address signal with the preset card address, and judge whether the data acquisition card is gated according to a comparison result;

the channel address generation module, is configured to generate a corresponding channel address signal after receiving the channel beat signal from the beat signal control module, and send to the signal processing module;

the signal processing module, is configured to preset a channel address for a data channel in the data acquisition card, compare the channel address signal with the preset channel address when the data acquisition card is gated, gate the corresponding data channel according to the comparison result, and send output data signals from the user circuit to the gated data channel, or acquire from the gated data channel input data signals and send to the user circuit.

The beneficial effect of the present invention is that, the data acquisition card, the extension control system of the data acquisition cards and the method thereof of the present invention support the user circuit to gate the data acquisition card and the data channel in the data acquisition card by the beat signals/CP, and to perform the data acquisition from the corresponding data channel, or to perform the function of signal control on it. The data acquisition card comprises hardware circuits which only include the counter, the comparator, etc. Compared with the way of the data acquisition card actively reporting data information to the user circuit by the communication protocol in the prior art, the present invention is adapted for various kinds of serial interfaces, can realize the parallel control of multiple data acquisition cards, thus having good universality and strong extensibility; and the data acquisition card directly accepts the control of the user circuit, doesn't have problems of software upgrading and protocol incompatible, and has the high stability.

The data acquisition card of the present invention can acquire various kinds of the input digital signals and/or the input analog signals from the gated data channel, or can send various kinds of the output digital signals and/or the output analog signals from the user circuit to the corresponding data channel, thus the usage is very extensive.

When the present invention performs gating on the data acquisition cards and the data channels, it uses technical schemes such as address zero clearing, latching, etc., and can improve the accuracy of the card gating and the channel gating and the validity of the data transmission.

PREFERRED EMBODIMENTS OF THE PRESENT INVENTION

The present invention realizes an extension control on a plurality of data acquisition cards configured in parallel by a user circuit; after the user circuit outputs a beat signal/CP to each data acquisition card by a bus, and if the card address of a certain data acquisition card matches with the beat signal/CP, then the data acquisition card is gated; the user circuit again inputs the beat signal/CP into the selected data acquisition card for gating a certain data channel, and finally the data acquisition card sends output data signals from the user circuit to the gated data channel, or acquires from the gated data channel input data signals and sends them to the user circuit. The specific embodiments of the present invention will be illustrated in combination with the accompanying drawings in the following.

Figure 1:
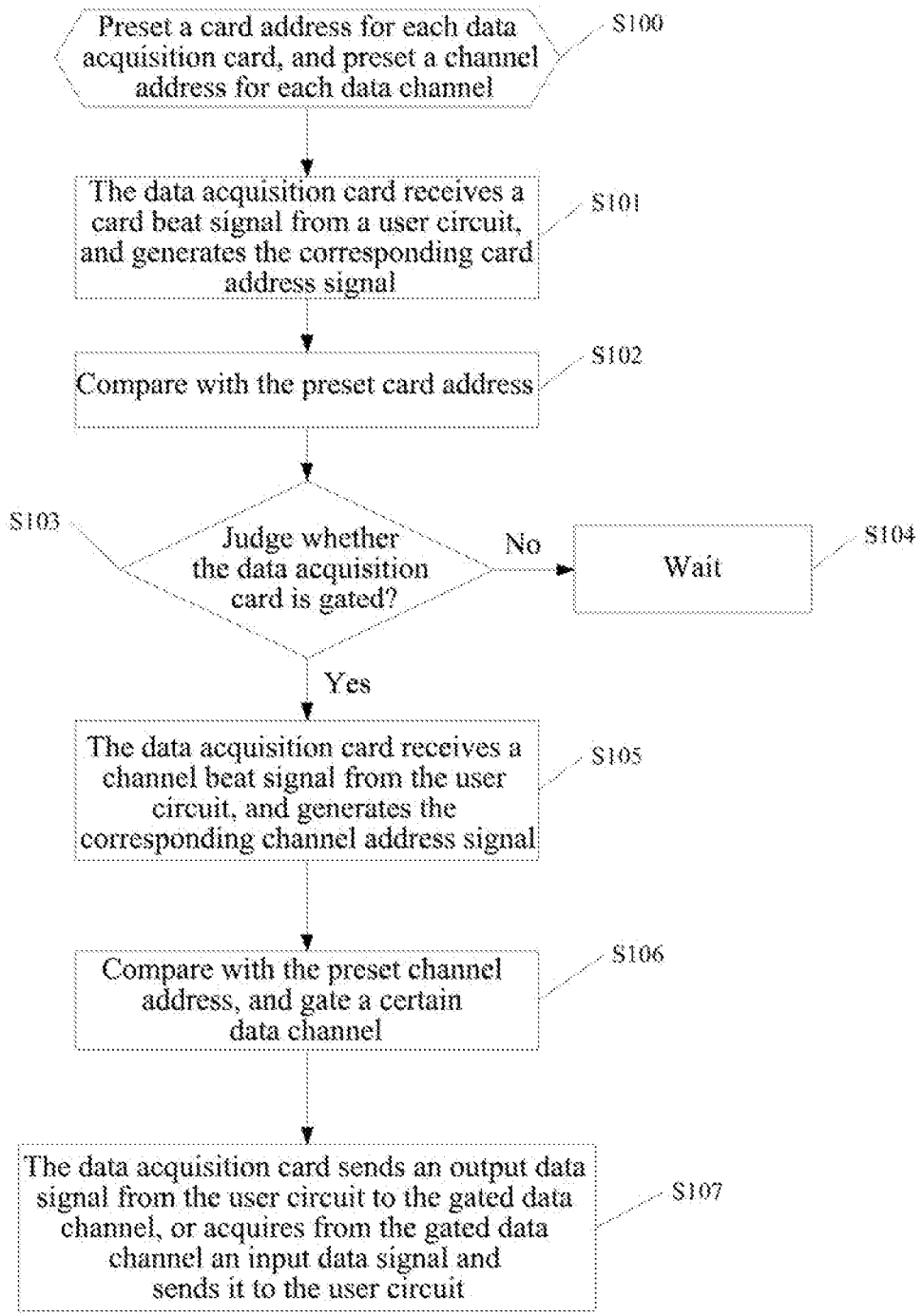
FIG. 1 is a flow chart of a first specific embodiment of an extension control method of data acquisition cards of the present invention.

As shown in FIG. 1, the first specific embodiment of the extension control method of the data acquisition cards of the present invention comprises steps as follows:

step S100: firstly preset the card address for each data acquisition card, and preset the channel address for each data channel in each data acquisition card, convenient for the user circuit to perform division on them.

Step S101: the data acquisition card receives the card beat signal(s)/CP from the user circuit, and generates the corresponding card address signal by a card counter. In this step, the data acquisition card uses the card counter for generating the card address signal corresponding to the number of the card beat signal(s)/CP, for example, when the user circuit needs to gate 1# data acquisition card, it needs to output one card beat signal/CP. Before this step, the user circuit can send a reset signal/RST to the data acquisition card, to make all the card counters and the channel counters in the data acquisition card into zero clearing, even though the zero clearing of the card address signal and the channel address signal is convenient for accurately gating the data acquisition card and the data channel.

Step S102: after the data acquisition card compares the generated card address signal with the preset card address, it judges whether the data acquisition card is gated. In this step, the data acquisition card can firstly preset a single card address in a comparator, then after the comparator receives the card address signal generated by the card counter, the comparator compares it with the pre-stored single card address, and finally outputs a single card gating signal/CS with active low level. Before this step, the user circuit can further send a card latch signal/BLE to the gated data acquisition card to latch the card address signal, and this step is realized by a latch; and the latch latches the card address signal to an input end of the comparator after receiving the card address signal generated by the card counter and the card latch signal/BLE from the user circuit.

Step S103: judge whether the data acquisition card is gated, if it is gated, then go to step S105, otherwise, go to step S104.

Step S104: go on waiting.

Step S105: the data acquisition card receives the channel beat signal/CP from the user circuit, and generates the corresponding channel address signal. Similar to the gating method of the acquisition card, the data acquisition card uses a channel counter for generating the channel address signal corresponding to the number of the channel beat signal(s), for example, when the user circuit needs to gate 1# data channel, it needs to output one channel beat signal/CP.

Step S106: the data acquisition card compares the generated channel address signal with the preset channel address, and if the preset channel address of a certain data channel matches with the generated channel address signal, then that data channel is gated.

Step S107: the data acquisition card sends the output data signals from the user circuit to the gated data channel, or acquires from the gated data channel the input data signals and sends them to the user circuit. Wherein, according to the specific application of the data acquisition card, the input data signals comprise the input digital signals (such as a signal for existence, an alarm signal) and/or the input analog signals (such as an electric current signal), etc., which need to be sent to the user circuit, and these input data signals, after conditioning, are sent to the user circuit respectively by passing through an input digital signal common channel DICS and an input analog signal common channel AICS; and the output data signals comprise the output digital signals (such as an on/off control signal) and/or the output analog signals (such as a voltage regulation signal), etc., and the user circuit sends them to the data acquisition card respectively by an output digital signal common channel DOCS and an output analog signal common channel AOCS, and then sends to the corresponding data channel after conditioning.

In order to realize that the user circuit performs signal control accurately on the data channel, and avoid signal interference, when the data acquisition card sends the output data signals from the user circuit to the gated data channel, the user circuit needs to send the channel latch signal to an addressing latch to isolate the gated data channel, which specifically comprises the following sub-steps:

(a) the gated data acquisition card receives the invalid channel latch signal/CLE from the user circuit;

(b) the gated data acquisition card receives the output data signal from the user circuit;

(c) the gated data acquisition card receives the valid channel latch signal/CLE from the user circuit;

(d) the gated data acquisition card receives the invalid channel latch signal/CLE from the user circuit.

In the above four steps, between each two steps there is a certain time delay to ensure the signal can be fully transmitted; and the time-ordered demand of the addressing latch needs to be met, the user circuit firstly sends the invalid channel latch signal/CLE to ensure that the bus signal does not mistakenly enter into the data channel, then sends the output data signal to the data acquisition card, and then sends the valid channel latch signal/CLE for performing the latching of the channel address after the signal has been stable, and finally sends once again the invalid channel latch signal/CLE and the task ends.

In the extension control method of the data acquisition cards of the present invention, the user circuit gates a plurality of data acquisition cards configured in parallel and the data channels in the data acquisition card by the beat signal(s)/CP, and the present invention realizes the data acquisition or control of the data of the corresponding data channel; the data acquisition card comprises the hardware circuit only including the counter, the comparator, etc., and compared with the way of the data acquisition card in the prior art reporting actively the data information to the user circuit by the communication protocol, the present invention is adapted for various kinds of serial interfaces, and can realize the parallel control of multiple data acquisition cards, thus having the good universality and the strong extensibility; and moreover, the data acquisition card directly accepts the control of the user circuit, and doesn't have problems of software upgrading and protocol incompatible, thereby remarkably improving the stability of the data acquisition and signal control performed on the data acquisition card.

In the present embodiment, in order to improve the data transmission distance, the beat signal/CP, the reset signal/RST, the card latch signal/BLE, the channel latch signal/CLE, the input digital signals and the output digital signals, after going through the difference level conversion, transmit by the difference bus, such as converting these signals into TTL/CMOS level or the LVTTL level signal of 3.3V to transmit in the bus network. Furthermore, the input analog signals and the output analog signals transmit in the bus by a frequency signal after going through the voltage/frequency conversion, such as the bus network like RS485, RS422, CAN, etc., in which one preferred embodiment is the RS485 bus, the maximum transmission distance of which comes up to 4000 feet and the highest transmission rate of which is 10 Mbps. The bus allows for connecting as many as 128 nodes, its largest digital signal extension ability reaches up to 32 channel/acquisition card×128 acquisition cards=4096 channels, and other analog acquisition amount and digital/analog control amount are also 4096, which can meet most of the application demands. The data acquisition card can also be supplied with power remotely by the user circuit through the bus network, for reducing the cost.

In the present embodiment, the beat signal/CP, the reset signal/RST, the card latch signal/BLE, the channel latch signal/CLE, the input digital signals and the output digital signals, etc., can all transmit in the bus by one cable; however, in order to be convenient for the data acquisition card dividing validly and identify various kinds of signals, and to improve the control efficiency and accuracy, different types of the input data signals and output data signals can transmit in the bus by different cables, and the card beat signal/CP and channel beat signal/CP can transmit in the bus by one single cable.

Furthermore, in order to further ensure the stability of data transmission, the status of the input digital signal common channel DICS, the input analog signal common channel AICS, the output digital signal common channel DOCS and the output analog signal common channel AOCS can be controlled by chip-select logic. When the reset signal/RST is valid or the card gating signal/CS is invalid (i.e., the data acquisition card is not gated), the ungated data acquisition card suspends sending the input data signals to the user circuit, and suspends receiving the output data signals from the user circuit, and the chip-select logic controls each signal common channel separating from the bus, that is, to ensure not receiving signals from the bus and not outputting signals to the bus to perform interference on the bus when the card is not acquiring data.

Figure 2:
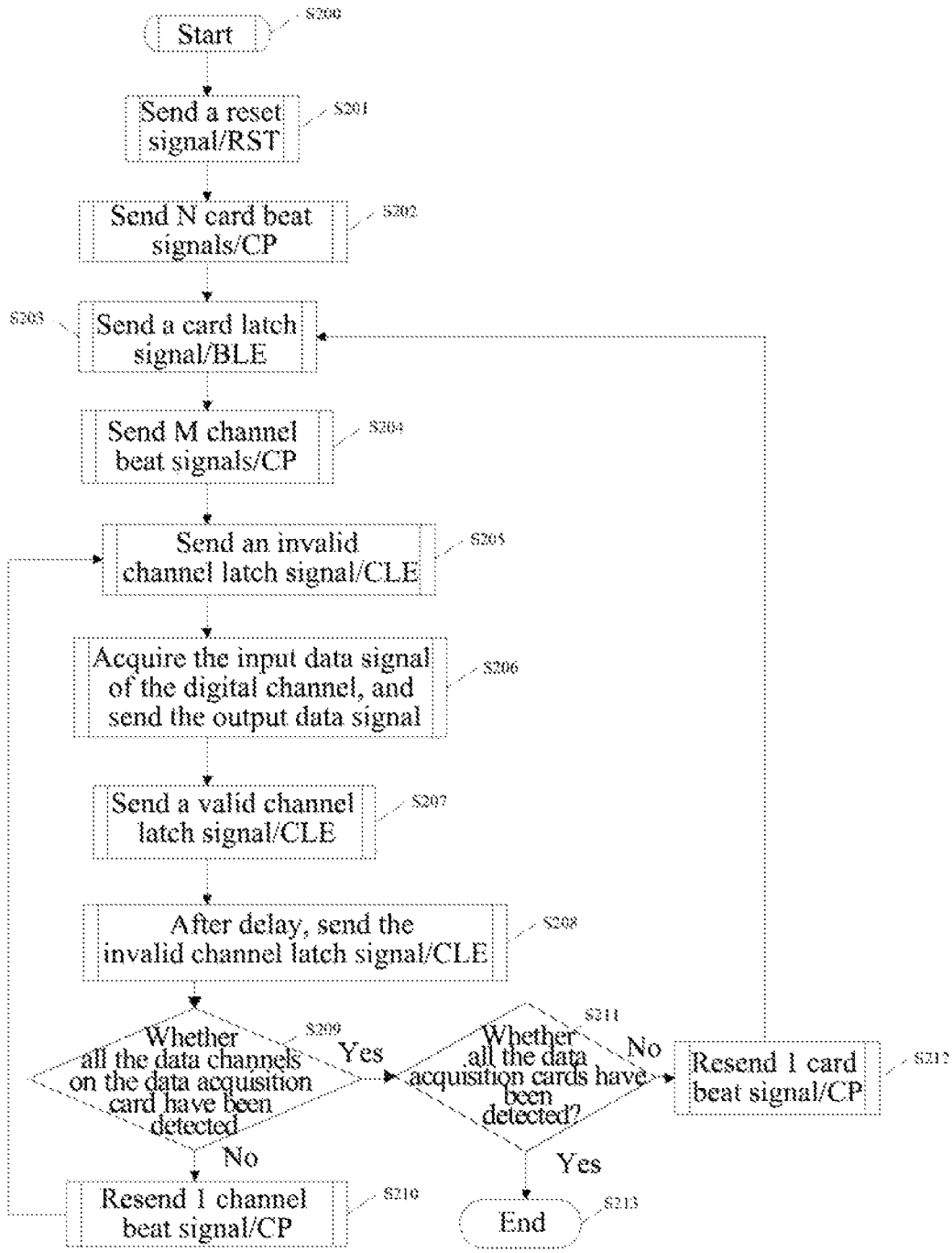
FIG. 2 is a flow chart of a second specific embodiment of an extension control method of data acquisition cards of the present invention.

FIG. 2 is a flow chart of the second specific embodiment of the extension control method of the data acquisition cards of the present invention, the embodiment realizes the procedure of the user circuit controlling a plurality of data channels in the plurality of data acquisition cards, and comprises the steps as follows:

step S200: the flow starts.

Step S201: the user circuit sends the reset signal/RST to the data acquisition card to perform zero clearing on all the card address signals and channel address signals.

Step S202: the user circuit sends N card beat signals/CP to the data acquisition card, needs to gate the corresponding data acquisition card, such as the first data acquisition card whose gating address is 0.

Step S203: the user circuit sends the card latch signal/BLE to the data acquisition card.

Step S204: the user circuit sends M channel beat signals/CP to the data acquisition card, which needs to gate the corresponding data channel, such as the first data channel whose gating address is 0.

Step S205: the user circuit sends the invalid channel latch signal/CLE to the data acquisition card.

Step S206: the gated data channel acquires the input data signals (which can be the input analog signals or the input digital signals) and sends them to the user circuit, following this step, the user circuit sends the output data signals (which can be the output analog signals or the output digital signals) to the gated data channel.

Step S207: the user circuit sends the valid channel latch signal/CLE to the data acquisition card.

Step S208: after a certain delay, the user circuit sends the invalid channel latch signal/CLE to the data acquisition card.

Step S209: it judges whether all the data channels in the data acquisition card have been detected, and if they have been detected, then go to step S211, otherwise, go to step S210.

Step S210: the user circuit resends one channel beat signal/CP to the data acquisition card, makes the count value of the channel counter add 1, needs to gate the next data channel, and repeats step S205.

Step S211: it judges whether all the data acquisition cards have been detected, and if they have been detected, then go to step S213, otherwise, go to step S212.

Step S212: it resends one card beat signal/CP to the data acquisition card, makes the count value of the card counter add 1, needs to gate the next data acquisition card; and repeats step S203.

Step S213: the task ends.

Figure 3:
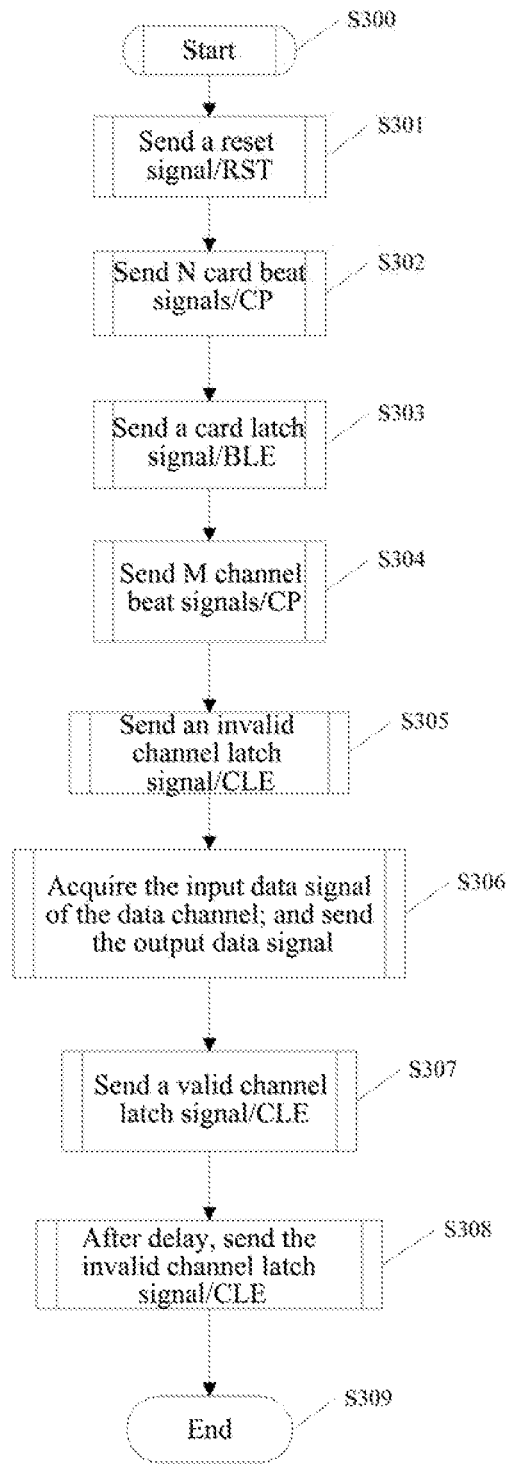
FIG. 3 is a flow chart of a third specific embodiment of an extension control method of data acquisition cards of the present invention.

FIG. 3 is the flow chart of the third specific embodiment of the extension control method of the data acquisition cards of the present invention, the embodiment realizes the procedure of the user circuit controlling a certain data channel in a certain data acquisition card, and comprises the steps as follows:

step S300: the flow starts.

Step S301: the user circuit sends the reset signal/RST to the data acquisition card to perform zero clearing on all the card address signals and channel address signals.

Step S302: the user circuit sends N card beat signals/CP to the data acquisition card, needs to gate the corresponding data acquisition card.

Step S303: the user circuit sends the card latch signal/BLE to the data acquisition card.

Step S304: the user circuit sends M channel beat signals/CP to the data acquisition card, needs to gate the corresponding data channel.

Step S305: the user circuit sends the invalid channel latch signal/CLE to the data acquisition card.

Step S306: the gated data channel acquires the input data signals (which can be the input analog signals or the input digital signals) and sends them to the user circuit, following this step, the user circuit sends the output data signals (which can be the output analog signals or the output digital signals) to the gated data channel.

Step S307: the user circuit sends the valid channel latch signal/CLE to the data acquisition card.

Step S308: after a certain delay, the user circuit sends the invalid channel latch signal/CLE to the data acquisition card.

Step S309: the task ends.

Figure 4:
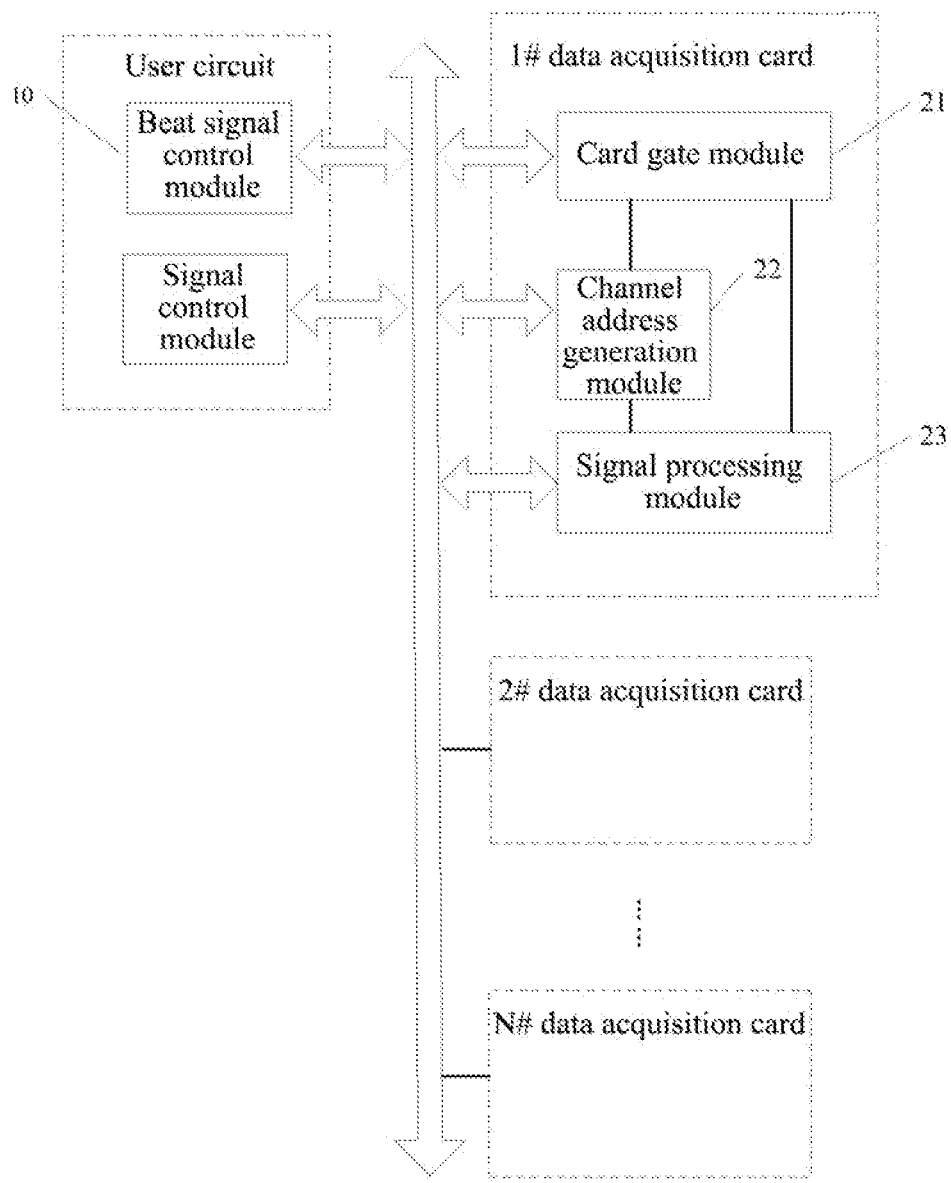
FIG. 4 is a schematic diagram of a first specific embodiment of an extension control system of data acquisition cards of the present invention.

FIG. 4 is the schematic diagram of the first specific embodiment of the extension control system of the data acquisition cards of the present invention, and the system comprises the user circuit and at least one data acquisition card configured in parallel, wherein, the user circuit comprises a beat signal control module 10, each data acquisition card comprises a card gate module 21, a channel address generation module 22 and a signal processing module 23.

The beat signal control module 10 is configured to send the card gating beat signal/CP and the channel gating beat signal/CP to the data acquisition card.

The card gate module 21 is configured to preset the card address for the data acquisition card, receive the card beat signal/CP from the beat signal control module 10 and generate the corresponding card address signal, and is further configured to judge whether the data acquisition card is gated after comparing the card address signal with the preset card address.

The channel address generation module 22 is configured to receive the channel beat signal/CP from the beat signal control module 10 and generate the corresponding channel address signal, and send it to the signal processing module 23.

The signal processing module 23 presets the channel address for each data channel in the dada acquisition card, and when the data acquisition card is gated, the signal processing module 23 is configured to gate the corresponding data channel after comparing the channel address signal with the preset channel address, and send the output data signals from the user circuit to the gated data channel, or acquire from the gated data channel the input data signals and send them to the user circuit.

Wherein, the card gate module 21 is equipped with the card counter, and the channel address generation module 22 is equipped with the channel counter. The card counter is configured to generate the corresponding card address signal according to the number of the card beat signal(s)/CP, and the channel counter is configured to generate the corresponding channel address signal according to the number of the channel beat signal(s)/CP.

Figure 5:
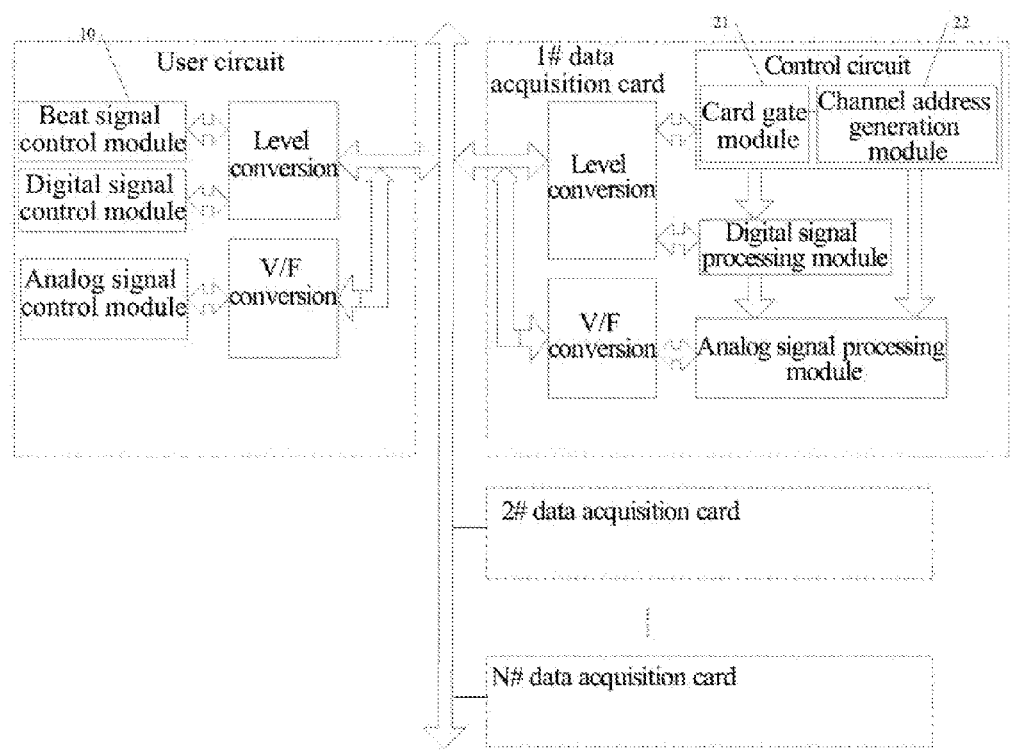
FIG. 5 is a schematic diagram of a second specific embodiment of an extension control system of data acquisition cards of the present invention.

FIG. 5 is the schematic diagram of the second specific embodiment of the extension control system of the data acquisition cards of the present invention. In this embodiment, both the card gate module 21 and the channel address generation module 22 in the data acquisition card are equipped in the control circuit, the signal processing module 23 comprises a digital signal processing module and an analog signal processing module, and accordingly, the signal control module in the user circuit comprises a digital signal control module and an analog signal control module. After the user circuit performs difference level conversion on the card beat signal/CP and the channel beat signal/CP in the beat signal control module 10, the user circuit sends them to the data acquisition card by the bus, and after the data acquisition card performs the difference level conversion on them, the data acquisition card sends respectively to the card gate module 21 and the channel gate module 22 in the control circuit for realizing the gating of the data acquisition card and the data channel, wherein the level conversion circuit can choose the chip such as a MAX485 and the like. The input digital signals and the output digital signals also transmit in the bus network after going through the difference level conversion, and the input analog signals and the output analog signals transmit in the bus network after going through the voltage/frequency conversion.

Figure 6:
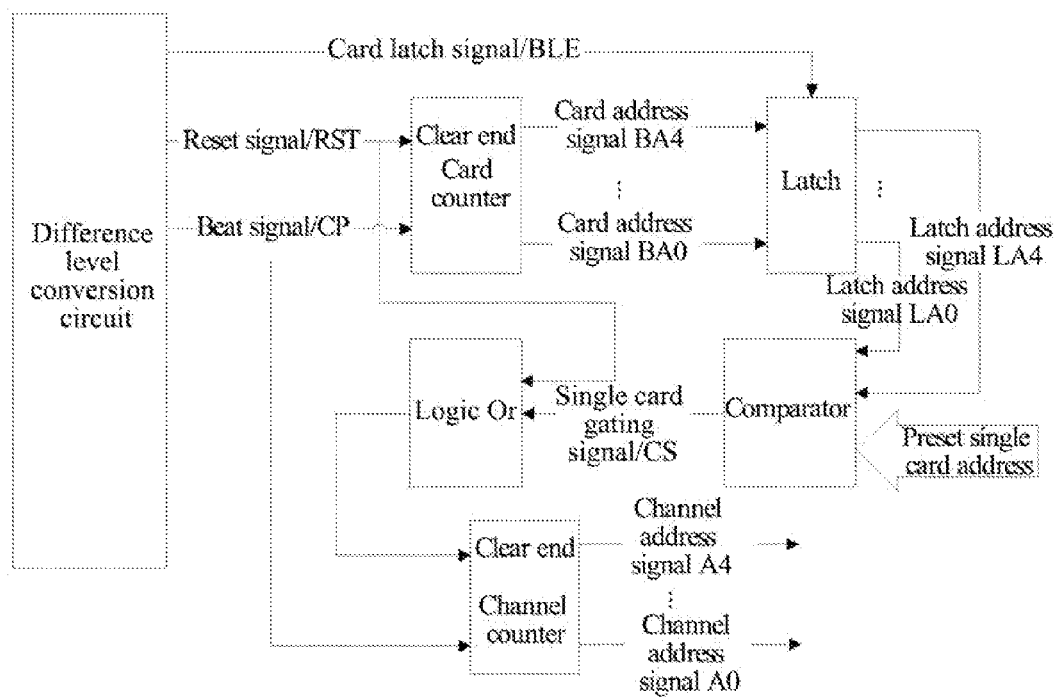
FIG. 6 is a schematic diagram of a specific embodiment of a control circuit of a data acquisition card of the present invention.

FIG. 6 is the schematic diagram of the specific embodiment of the control circuit of the data acquisition card of the present invention. This embodiment can realize that 5 data acquisition cards are parallel, and each data acquisition card acquires 80 data information (32 input digital signals, 16 input analog signals, 16 output digital signals and 16 output analog signals) of 16 data channels. 5 data acquisition cards directly connect with the user unit by the bus network. In the control circuit of the data acquisition card of the present embodiment, the card gate module 21 comprises a card counter, a latch and a comparator, and the channel address generation module 22 comprises a channel counter.

The card counter of the present embodiment selects and uses the counter of module 5, and the channel counter is the counter of module 32. Considering the subsequent extension and application, the two counters also can be designed to be asynchronous counters of module 32, such as selecting and using the commonly used chip of 74LS161. The latch and the comparator can also select the universal chip such as 74HC573, 74HC688, etc., and preset the single card addresses 0~31 by a 5-bit dial switch, or only use a 3-bit dial switch to set the single card addresses 0~4.

Figure 7:
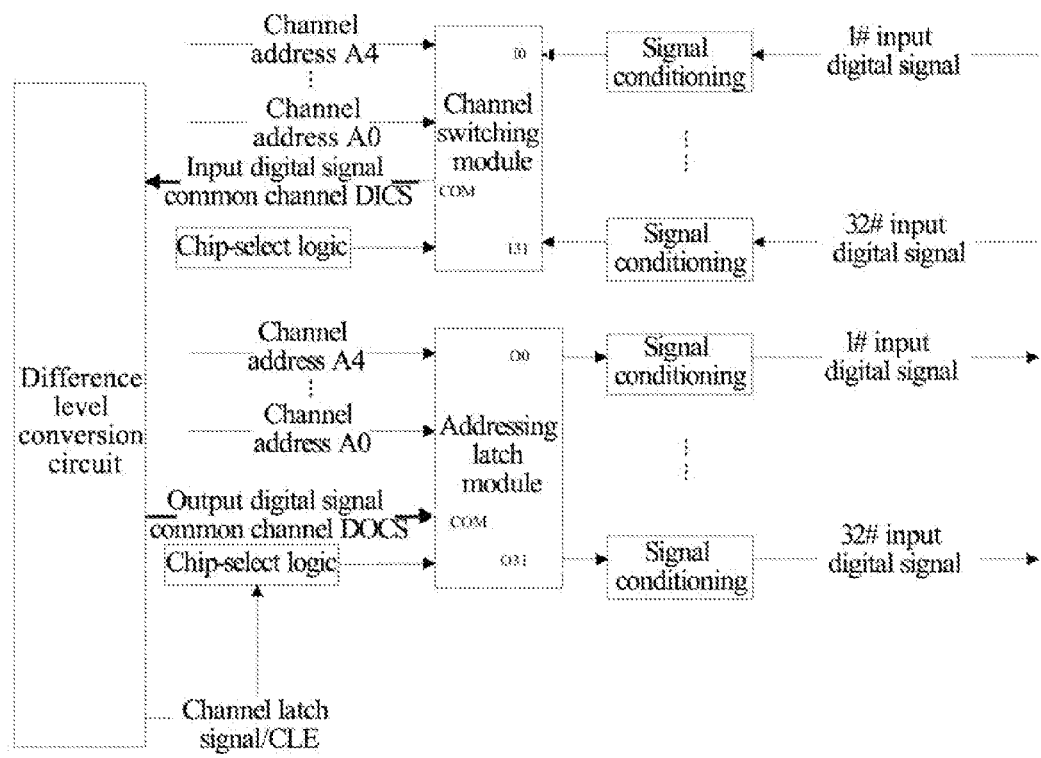
FIG. 7 is a schematic diagram of a specific embodiment of a digital signal processing module of a data acquisition card of the present invention.

FIG. 7 is the schematic diagram of the specific embodiment of the digital signal processing module of the data acquisition card of the present invention, and the system comprises a channel switching module and an addressing latch module. After the channel switching module selects the data channel according to the card gating signal/CS in the chip-select logic and the generated channel address signal, it acquires the input digital signals from the data channel, wherein these input digital signals enter into the channel switching module after passing through the necessary conditioning such as shaping and isolating, and transmit by the input digital signal common channel DICS. Likewise, the addressing latch module, after selecting the data channel according to the card gating signal/CS in the chip-select logic and the generated channel address signal, makes the output digital signals from the output digital signal common channel DOCS pass through the necessary conditioning such as shaping and isolating, etc., and then the signals enter into the corresponding data channel. The chip-select logic combines with the channel latch signal/CLE for performing gating control of the data channel on the addressing latch module. The channel switching module can select a 32-channel analog switch, for example, the 32-channel analog switch is composed of 2 of the selected single 16-channel analog switches, e.g., CD4067, and the addressing latch can be combined by incorporating a plurality of chips similar to 74HC259.

Figure 8:
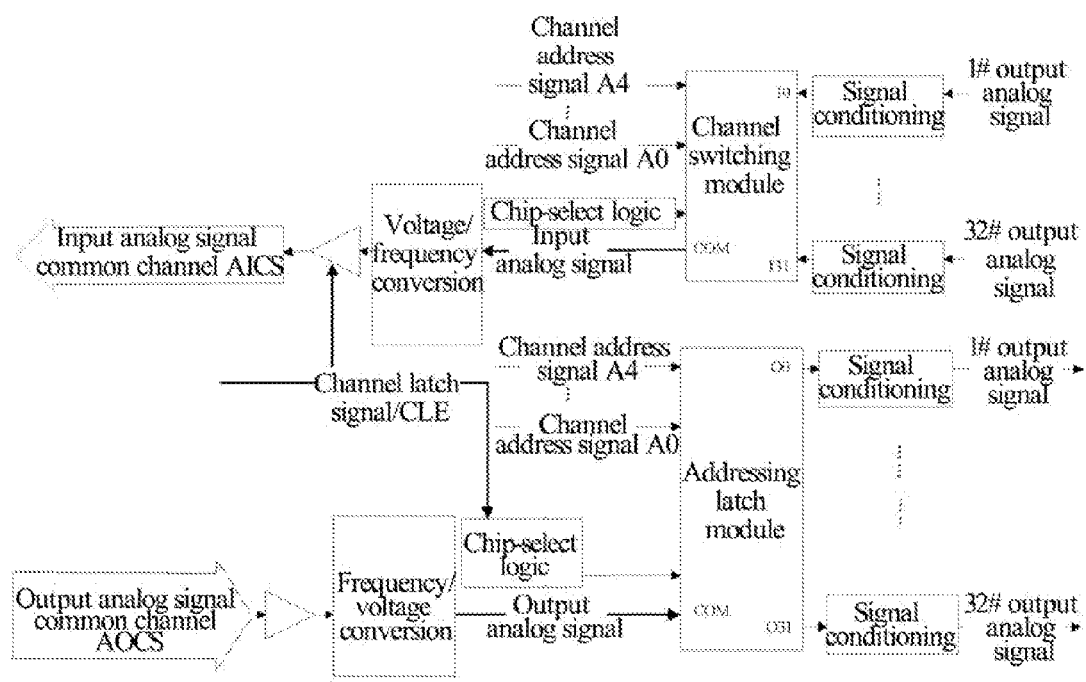
FIG. 8 is a schematic diagram of a specific embodiment of an analog signal processing module of a data acquisition card of the present invention.

FIG. 8 is the schematic diagram of the specific embodiment of the analog signal processing module of the data acquisition card of the present invention, the analog signal processing module also comprises the channel switching module and the addressing latch module. The channel switching module, after selecting the data channel according to the card gating signal/CS in the chip-select logic and the generated channel address signal, acquires the input analog signals from the data channel, wherein these input analog signals enter into the channel switching module after passing through the necessary conditioning such as shaping and isolating, and then transmit by passing through a triple gate (the enable end of the triple gate is controlled by the channel latch signal/CLE) input analog signal common channel AICS after passing through the voltage/frequency conversion. Likewise, the output analog signals from the output analog signal common channel AOCS enter into the addressing latch module after passing through the voltage/frequency conversion, and the addressing latch module, after selecting the data channel according to the card gating signal/CS in the chip-select logic and the generated channel address signal, makes the output analog signals pass through the necessary conditioning such as shaping and isolating, etc., and then the signals enter into the corresponding data channel. The voltage/frequency conversion circuit of the present embodiment can select the commonly used chip like VFC320 and the like.

Figure 9:
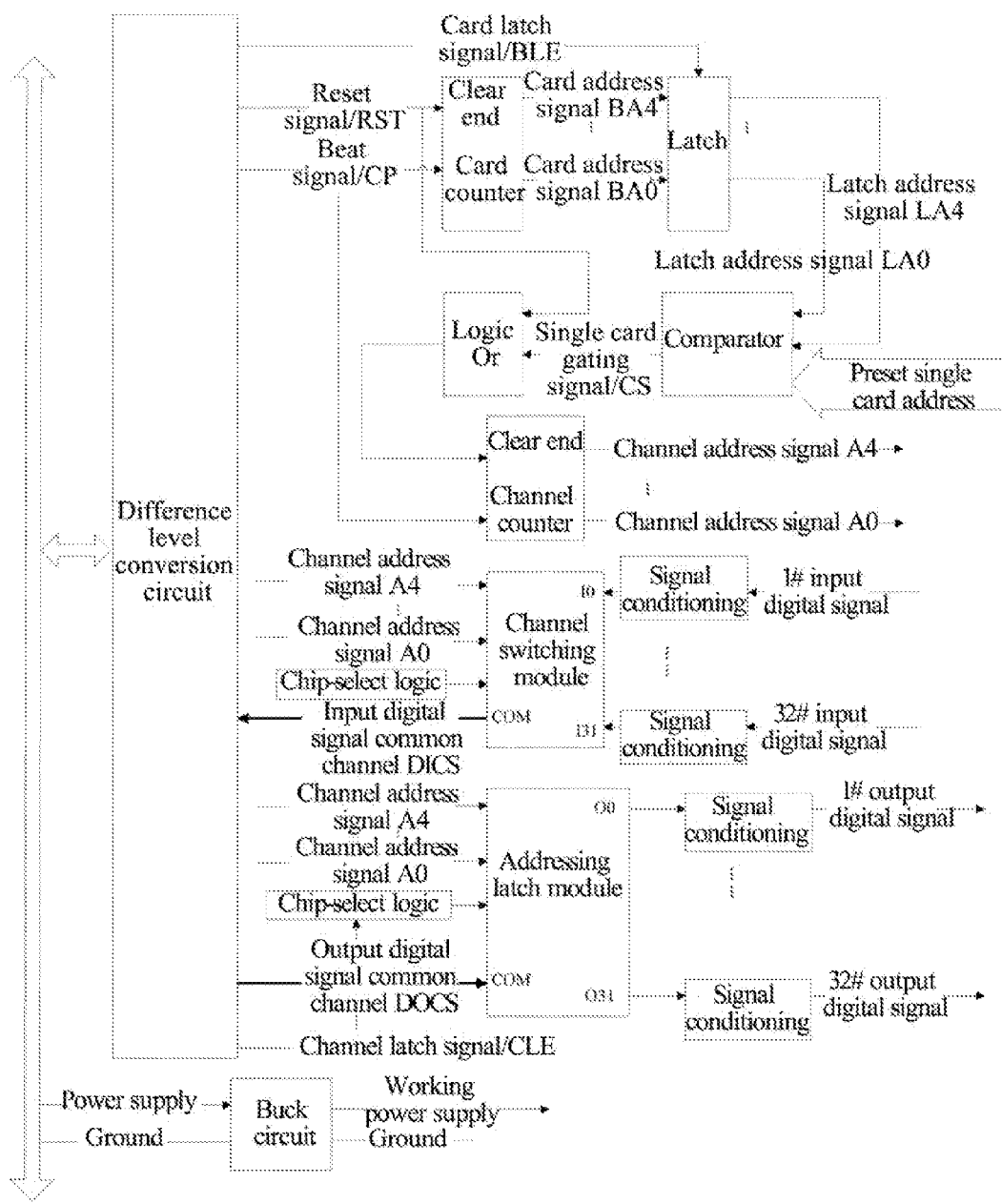
FIG. 9 is a schematic diagram of a specific embodiment of a digital signal data acquisition card of the present invention.

FIG. 9 is the schematic diagram of the specific embodiment of the digital signal data acquisition card of the present invention, the function of the data acquisition card of this embodiment is relative single, and the data acquisition card, is only configured to receive the output digital signals from the user circuit, or acquire from each data channel the input digital signals and send them to the user circuit. The data acquisition card of the present embodiment further comprises a buck module, which is configured to receive the remote power supply and the ground signal from the user circuit.

Figure 10:
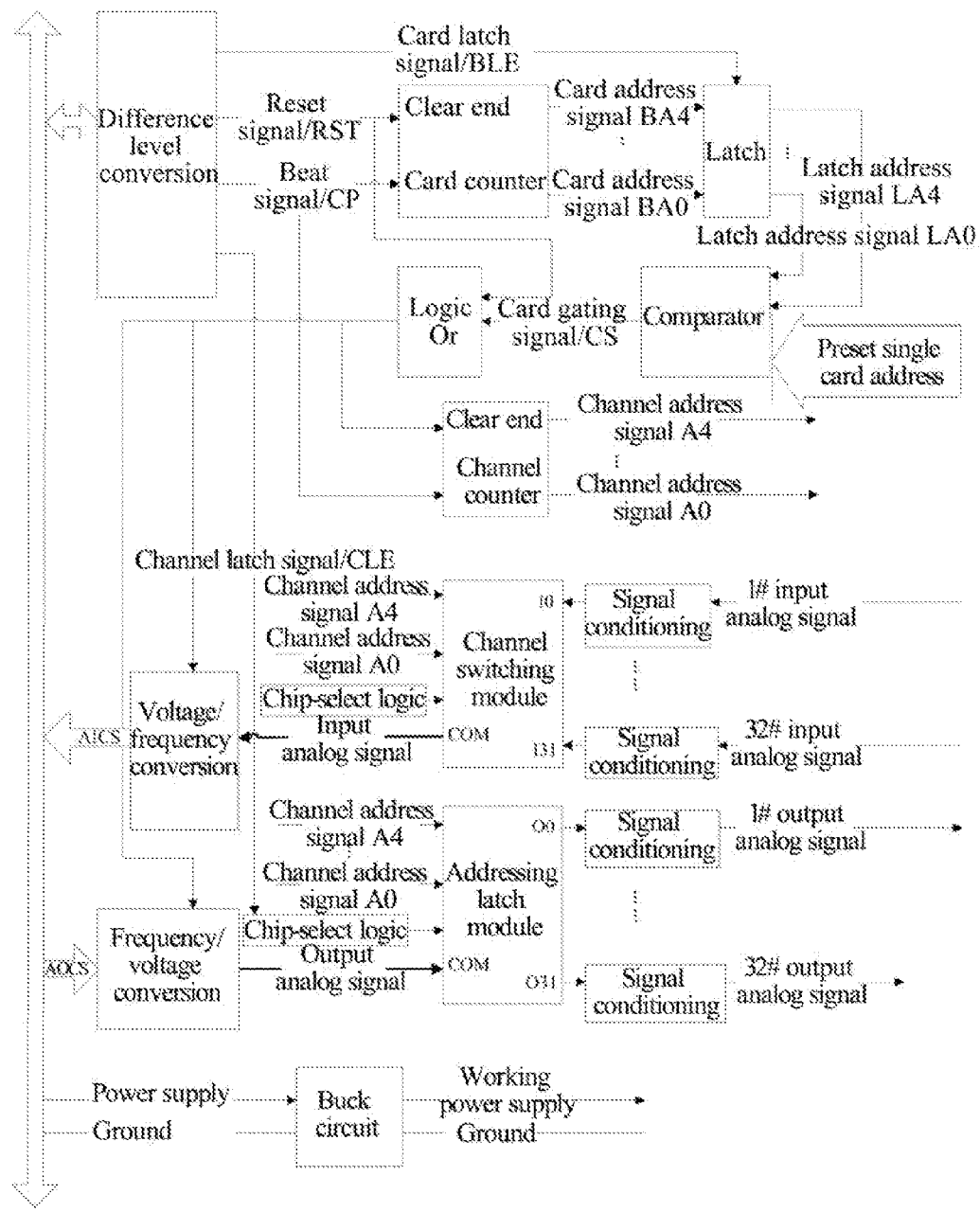
FIG. 10 is a schematic diagram of a specific embodiment of an analog signal data acquisition card of the present invention.

FIG. 10 is the schematic diagram of the specific embodiment of the analog signal data acquisition card of the present invention, the function of the data acquisition card of this embodiment is relatively single, and the data acquisition card is only configured to receive the output analog signals from the user circuit, or acquire from each data channel the input analog signals and send them to the user circuit.

In view of that, the data acquisition card, the extension control system of the data acquisition cards and the method thereof of the present invention support the user circuit gating the data acquisition card and the data channel in the data acquisition card by the beat signal/CP, and performing data acquisition from the corresponding data channel, or performing the function of signal control on it. The data acquisition card comprises hardware circuit only including a counter, a comparator, etc. Compared with the way of the data acquisition card actively reporting data information to the user circuit by the communication protocol in the prior art, the present invention is adapted for various kinds of serial interfaces, can realize the parallel control of multiple data acquisition cards, thus having a good universality and strong extensibility; and moreover the data acquisition card directly accepts the control of the user circuit, doesn't have problems of software upgrading and protocol incompatible, and has a high stability.

The data acquisition card of the present invention can acquire various kinds of input digital signals and/or input analog signals from the gated data channel, or can send various kinds of output digital signals and/or output analog signals from the user unit circuit to the corresponding data channel, thus the usage is very extensive.

When the present invention performs gating on the data acquisition card and the data channel, it uses technical schemes such as address zero clearing, latching, etc., and can improve the accuracy of the card gating and the channel gating and the validity of the data transmission.

The above content is the further illustration in details for the present invention in combination with the specific embodiment, it is not affirmed that the specific implementation of the present invention is only limited to these illustrations. For those skilled in the art of the present invention, without departing from the concept of the present invention, they can make several simple deduction and replacement, which shall fall into the protection scope of the present invention.

I claim:

1. An extension control method of data acquisition cards, adapted for the data acquisition cards configured in parallel, comprising:
   presetting a card address for each data acquisition card, and presetting a channel address for each data channel in each data acquisition card; wherein the method further comprises:
   each data acquisition card receiving a card beat signal from a user circuit, generating a corresponding card address signal, and comparing the card address signal with the preset card address to judge whether to be gated;
   when a data acquisition card is judged to be gated, the data acquisition card receiving a channel beat signal from the user circuit and generating a corresponding channel address signal, and after the data acquisition card compares the channel address signal with the preset channel address, gating the data channel corresponding to the channel address signal.

2. The method according to claim 1, wherein, after gating the data channel corresponding to the channel address signal, the method further comprises following steps: the data acquisition card sending data signals output from the user circuit to the gated data channel, or acquiring data signals input from the gated data channel and sending the acquired data signals to the user circuit.

3. The method according to claim 2, wherein: the input data signals comprise input digital signals and/or input analog signals; and the output data signals comprise output digital signals and/or output analog signals.

4. The method according to claim 3, wherein: before the data acquisition card receives the card beat signal from the user circuit, the method further comprises a step of performing zero clearing on the card address signal or the channel address signal.

5. The method according to claim 3, wherein: after the data acquisition card generates the corresponding card address signal, the method further comprises a step of latching the card address signal.

6. The method according to claim 3, further comprising: an ungated data acquisition card suspending sending the input data signals to the user circuit, and suspending receiving the output data signals from the user circuit.

7. The method according to claim 2, wherein different types of the input data signals and the output data signals are transmitted in a bus through different cables;
   the card beat signal and the channel beat signal are transmitted in another bus through one individual cable.

8. The method according to claim 7, wherein: before the data acquisition card receives the card beat signal from the user circuit, the method further comprises a step of performing zero clearing on the card address signal or the channel address signal.

9. The method according to claim 7, wherein: after the data acquisition card generates the corresponding card address signal, the method further comprises a step of latching the card address signal.

10. The method according to claim 7, further comprising: an ungated data acquisition card suspending sending the input data signals to the user circuit, and suspending receiving the output data signals from the user circuit.

11. The method according to claim 2, wherein: the procedure of the data acquisition card sending the data signals output from the user circuit to the gated data channel comprises:
   the gated data acquisition card receiving an invalid channel latch signal;
   the gated data acquisition card receiving the data signals output from the user circuit;
   the gated data acquisition card receiving a valid channel latch signal;
   the gated data acquisition card receiving an invalid channel latch signal.

12. The method according to claim 2, wherein: before the data acquisition card receives the card beat signal from the user circuit, the method further comprises a step of performing zero clearing on the card address signal or the channel address signal.

13. The method according to claim 2, wherein: after the data acquisition card generates the corresponding card address signal, the method further comprises a step of latching the card address signal.

14. The method according to claim 2, further comprising: an ungated data acquisition card suspending sending the input data signals to the user circuit, and suspending receiving the output data signals from the user circuit.

15. The method according to claim 1, wherein: before the data acquisition card receives the card beat signal from the user circuit, the method further comprises a step of performing zero clearing on the card address signal or the channel address signal.

16. The method according to claim 1, wherein: after the data acquisition card generates the corresponding card address signal, the method further comprises a step of latching the card address signal.

17. The method according to claim 1, further comprising: an ungated data acquisition card suspending sending the input data signals to the user circuit, and suspending receiving the output data signals from the user circuit.

18. A data acquisition card, comprising a card gate module, a channel address generation module and a signal processing module; wherein,
- the card gate module is configured to preset a card address, receive a card beat signal from a user circuit and generate a corresponding card address signal, compare the card address signal with the preset card address to judge whether the data acquisition card is gated;
- the channel address generation module is configured to receive a channel beat signal from the user circuit and generate a corresponding channel address signal, and send the channel address signal to the signal processing module;
- the signal processing module is configured to preset a channel address for a data channel, compare the channel address signal with the preset channel address when the data acquisition card is gated, gate the corresponding data channel according to a comparison result, and send data signals output from the user circuit to the gated data channel, or acquire data signals input from the gated data channel and send the acquired data signals to the user circuit.

19. The data acquisition card according to claim 18, wherein: both the card gate module and the channel address generation module are equipped with a counter respectively;
- the counter in the card gate module is configured to generate the corresponding card address signal according to a number of card beat signal(s);
- the counter in the channel address generation module is configured to generate the corresponding channel address signal according to a number of channel beat signal(s).

20. An extension control system of data acquisition cards, comprising a user circuit and the data acquisition cards configured in parallel, wherein: the user circuit comprises a beat signal control module, and each data acquisition card comprises a card gate module, a channel address generation module and a signal processing module; wherein,
- the beat signal control module is configured to send a card beat signal and a channel beat signal to a data acquisition card;
- the card gate module is configured to preset a card address for the data acquisition card, receive the card beat signal from the beat signal control module and generate a corresponding card address signal, compare the card address signal with the preset card address to judge whether the data acquisition card is gated according to a comparison result;
- the channel address generation module is configured to generate a corresponding channel address signal after receiving the channel beat signal from the beat signal control module, and send the channel address signal to the signal processing module;
- the signal processing module is configured to preset a channel address for a data channel in the data acquisition card, compare the channel address signal with the preset channel address when the data acquisition card is gated, gate the corresponding data channel according to the comparison result, and send data signals output from the user circuit to the gated data channel, or acquire data signals input from the gated data channel and send the acquired data signals to the user circuit.

\* \* \* \* \*